(12) United States Patent
Kume et al.

(10) Patent No.: US 11,990,646 B2
(45) Date of Patent: May 21, 2024

(54) POWER STORAGE MODULE

(71) Applicant: Panasonic Intellectual Property Management Co., Ltd., Osaka (JP)

(72) Inventors: Shingo Kume, Osaka (JP); Akihiro Yoneyama, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 371 days.

(21) Appl. No.: 17/288,583

(22) PCT Filed: Nov. 12, 2019

(86) PCT No.: PCT/JP2019/044258
§ 371 (c)(1),
(2) Date: Apr. 26, 2021

(87) PCT Pub. No.: WO2020/105502
PCT Pub. Date: May 28, 2020

(65) Prior Publication Data
US 2021/0391629 A1    Dec. 16, 2021

(30) Foreign Application Priority Data
Nov. 20, 2018  (JP) .................................. 2018-217661

(51) Int. Cl.
*H01M 50/505*    (2021.01)
*H01M 50/209*    (2021.01)
(Continued)

(52) U.S. Cl.
CPC ....... *H01M 50/505* (2021.01); *H01M 50/209* (2021.01); *H01M 50/291* (2021.01);
(Continued)

(58) Field of Classification Search
CPC .. H01M 50/505; H01M 50/50; H01M 50/545; H01M 50/209; H01M 50/291; H01M 50/557
See application file for complete search history.

(56) References Cited

U.S. PATENT DOCUMENTS

2012/0009461 A1*   1/2012  Kim .................... H01M 50/271
                                                    429/158
2012/0270097 A1   10/2012  Yasui et al.
(Continued)

FOREIGN PATENT DOCUMENTS

CN    103050655 A    4/2013
CN    106537533 A    3/2017
(Continued)

OTHER PUBLICATIONS

International Search Report of PCT application No. PCT/JP2019/044258 dated Feb. 10, 2020.
(Continued)

*Primary Examiner* — Jane J Rhee
(74) *Attorney, Agent, or Firm* — Rimon P.C.

(57) ABSTRACT

A power storage module includes a plurality of power storage devices and a bus bar electrically connecting the plurality of power storage devices. Each power storage device has a housing and a pair of output terminals disposed on a first surface of the housing. The bus bar has the plurality of terminal connections connected to the output terminals of each power storage device, and a linking part connecting the plurality of terminal connections. Each terminal connection part has a first part connected to each output terminal and a second part continuous from the first part and extending along a second surface spreading in a direction intersecting the first surface of the housing. Each linking part has a third part that connects the second parts of the adjacent terminal connections to each other.

8 Claims, 6 Drawing Sheets

(51) Int. Cl.
    *H01M 50/291*     (2021.01)
    *H01M 50/50*     (2021.01)
    *H01M 50/545*     (2021.01)
    *H01M 50/557*     (2021.01)

(52) U.S. Cl.
    CPC ......... *H01M 50/50* (2021.01); *H01M 50/545* (2021.01); *H01M 50/557* (2021.01)

(56) References Cited

U.S. PATENT DOCUMENTS

| | | | |
|---|---|---|---|
| 2013/0089755 A1* | 4/2013 | Park | H01M 50/529 |
| | | | 429/211 |
| 2017/0207027 A1 | 7/2017 | Sato et al. | |
| 2021/0210821 A1* | 7/2021 | Okada | H01M 50/557 |

FOREIGN PATENT DOCUMENTS

| | | |
|---|---|---|
| CN | 108604658 A | 9/2018 |
| JP | 2012-018904 | 1/2012 |
| JP | 2013-084570 | 5/2013 |
| JP | 2015-179578 | 10/2015 |
| JP | 2018-032560 | 3/2018 |
| WO | 2012/081140 | 6/2012 |
| WO | 2017/130706 | 8/2017 |

OTHER PUBLICATIONS

English Translation of Chinese Office Action dated Dec. 15, 2021 for the related Chinese Patent Application No. 201980063927.0.

\* cited by examiner

POWER STORAGE MODULE

CROSS-REFERENCE TO RELATED APPLICATIONS

This application is a U.S. national stage application of the PCT International Application No. PCT/JP2019/044258 filed on Nov. 12, 2019, which claims the benefit of foreign priority of Japanese patent application No. 2018-217661 filed on Nov. 20, 2018, the contents all of which are incorporated herein by reference.

TECHNICAL FIELD

The present invention relates to a power storage module.

BACKGROUND ART

As a power source that requires a high output voltage, used for a vehicle, for example, a power storage module is known in which a plurality of power storage devices (for example, batteries) is connected in series. In a general power storage module, a plurality of power storage devices is arranged in a plane, and output terminals of adjacent power storage devices are connected by a bus bar. Further, the power storage module is generally arranged such that the output terminals of the power storage devices face upward.

In relation to such a power storage module, PTL 1 discloses a power storage module in which a bus bar is placed on a terminal forming surface of a power storage device. The bus bar of PTL 1 has terminal connections joined to output terminals of each power storage device at both ends of a plate-shaped plate, and a curved part protruding upward from the terminal forming surface at a center of the plate. The bus bar, provided with the curved part, is allowed to follow a relative displacement of the plurality of power storage devices connected to the bus bar, particularly a displacement in an arrangement direction of the power storage devices. As a result, a load applied to a connection between each power storage device and the bus bar can be reduced, and thus an electrical connection of the plurality of power storage devices can be stably maintained.

CITATION LIST

Patent Literature

PTL 1: Unexamined Japanese Patent Publication No. 2012-018904

SUMMARY OF THE INVENTION

There is always a demand for reducing an installation space of a power storage module. In particular, there is a great demand for reducing a height rather than an installation area of the installation space of the power storage module. That is, there is a great demand for reducing a size of the power storage module in a direction in which the terminal forming surface of each power storage device and a surface facing the terminal forming surface are aligned, or in other words, reducing a height of the power storage module, rather than for reducing a size of the power storage module in a surface direction in which the plurality of power storage devices is arranged. In response to this demand, it is also a demand for reducing a height of the bus bar and the like disposed above each power storage device configuring the power storage module.

The present invention has been made in view of such circumstances, and an object of the present invention is to provide a technique for reducing a height of a power storage module.

One aspect of the present invention is a power storage module. The power storage module includes a plurality of power storage devices and a bus bar electrically connecting the plurality of power storage devices. Each power storage device has a housing and a pair of output terminals disposed on a first surface of the housing. The bus bar has the plurality of terminal connections connected to the output terminals of each power storage device, and a linking part connecting the plurality of terminal connections. Each terminal connection part has a first part connected to each output terminal and a second part continuous from the first part and extending along a second surface spreading in a direction intersecting the first surface of the housing. Each linking part has a third part that connects the second parts of the adjacent terminal connections to each other.

Any combination of the above components and a conversion of an expression of the present invention between methods, devices, systems, and the like are also effective as an aspect of the present invention.

The present invention can reduce a height of a power storage module.

DESCRIPTION OF EMBODIMENTS

Hereinafter, the present invention will be described with reference to the drawings on the basis of preferred exemplary embodiments. The exemplary embodiments do not limit the invention, but are exemplary, and all the characteristics and combinations thereof described in the exemplary embodiments are not necessarily essential to the invention. The same or equivalent components, members, and processes shown in the drawings shall be designated by the same reference numerals, and redundant description will be omitted as appropriate. The scale, shape, and quantity of each part shown in the drawings are set for convenience in order to facilitate explanation, and are not interpreted in a limited manner unless otherwise specified. Terms such as "first" and "second", used in the specification or claims, do not represent any order or importance unless otherwise specified, but are used to distinguish one configuration from another configuration. Some of the members that are unimportant for explaining the exemplary embodiment in the drawings are omitted.

First Exemplary Embodiment

Figure 1:
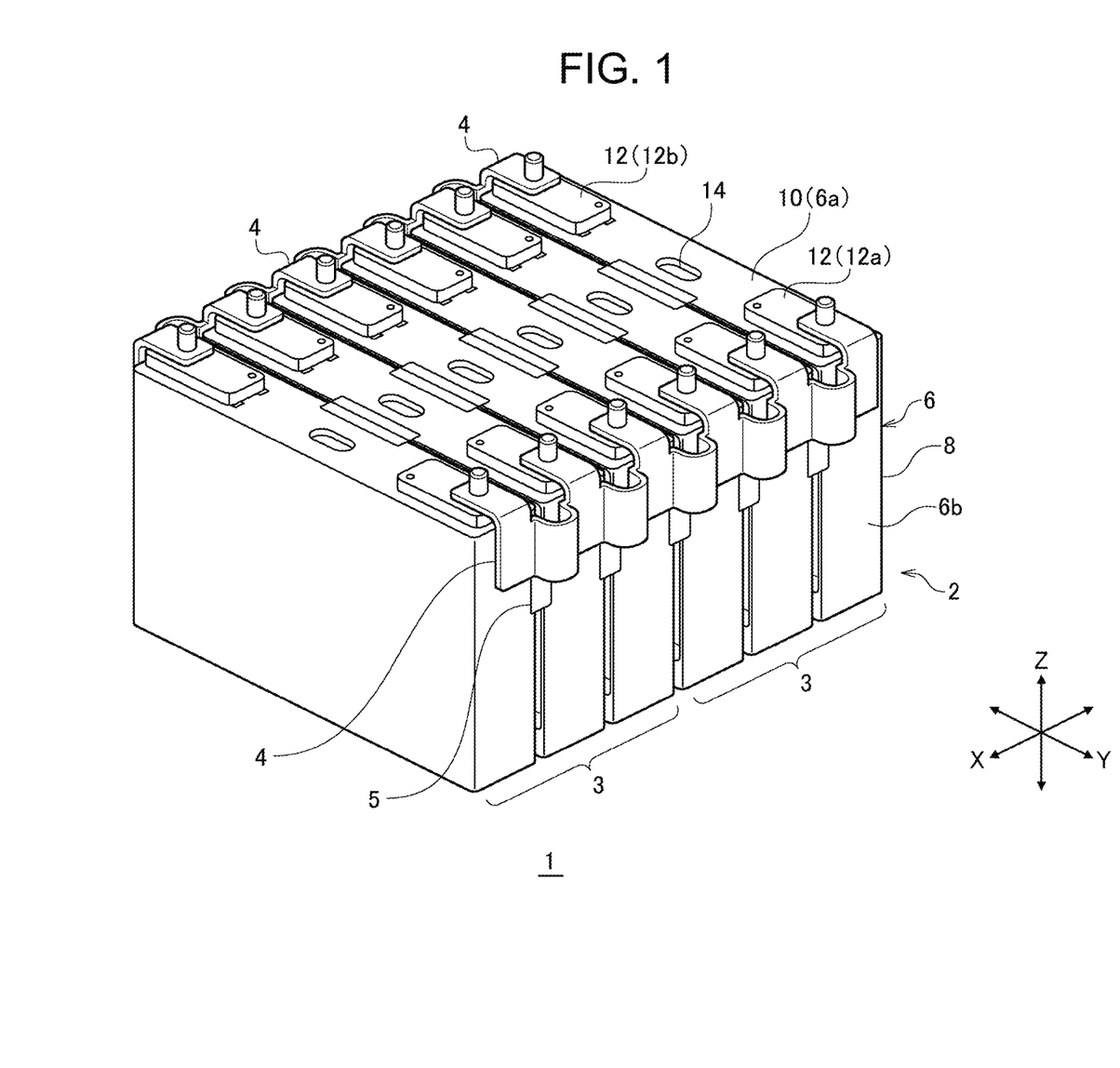
FIG. 1 is a perspective view of a power storage module according to a first exemplary embodiment.

FIG. 1 is a perspective view of a power storage module according to a first exemplary embodiment. Power storage module 1 includes a plurality of power storage devices 2 and a plurality of bus bars 4.

Each power storage device 2 is a rechargeable secondary battery such as a lithium ion battery, a nickel-hydrogen battery, or a nickel-cadmium battery. Each power storage device 2 is a so-called square battery, and has housing 6 having a flat rectangular parallelepiped shape. Housing 6 includes exterior can 8 and sealing plate 10. Exterior can 8 has, for example, a bottomed cylindrical shape and has a substantially rectangular opening (not shown). Exterior can 8 accommodates an electrode body, an electrolytic solution, and the like through this opening. The opening of exterior can 8 is sealed by sealing plate 10. Sealing plate 10 is, for example, a substantially rectangular plate. Sealing plate 10 configures first surface 6a of housing 6.

On sealing plate 10, that is, first surface 6a of housing 6, positive-electrode output terminal 12 is provided near one end in a longitudinal direction and negative-electrode output terminal 12 is disposed near the other end in the longitudinal direction. A pair of output terminals 12 is electrically connected to a positive electrode plate and a negative electrode plate configuring the electrode body, respectively. Hereinafter, positive-electrode output terminal 12 will be referred to as positive electrode terminal 12a, and negative-electrode output terminal 12 will be referred to as negative electrode terminal 12b. When there is no need to distinguish a polarity of output terminals 12, positive electrode terminal 12a and negative electrode terminal 12b are collectively referred to as output terminals 12. Exterior can 8 and sealing plate 10 are conductors, and include a metal such as aluminum, iron, or stainless steel. Sealing plate 10 and the opening of exterior can 8 are joined by, for example, a laser. Each of the pair of output terminals 12 is inserted into a through hole (not shown) formed in sealing plate 10. An insulating sealing member (not shown) is interposed between the pair of output terminals 12 and each through hole.

Safety valve 14 is provided between the pair of output terminals 12 on first surface 6a of housing 6. Safety valve 14 is configured to open when an internal pressure of housing 6 rises to or above a predetermined value to release gas inside housing 6. Safety valve 14 of each power storage device 2 is connected to a gas duct (not shown), and the gas inside each power storage device 2 is discharged from safety valve 14 to the gas duct. Safety valve 14 includes, for example, a thin-walled part that is provided at a part of sealing plate 10 and thinner than the other parts, and a linear groove formed on a surface of the thin-walled part. In this configuration, when the internal pressure of housing 6 rises, the thin-walled part is torn from the groove to open safety valve 14.

Housing 6 has a facing surface that faces first surface 6a. Further, housing 6 has four side surfaces connecting first surface 6a and the facing surface. Two of the four side surfaces are a pair of long side surfaces connected to two long sides of first surface 6a. Each long side surface is a surface having the largest area among the surfaces of housing 6, that is, a main surface. The remaining two side surfaces, excluding the two long side surfaces, are a pair of short side surfaces connected to two short sides of first surface 6a. The pair of short side surfaces configures second surface 6b of housing 6.

Exterior can 8 is covered with, for example, an insulating film (not shown). The insulating film is, for example, a shrink tube (such as a heat shrinkable tube). Heating the insulating film after exterior can 8 is inserted into the tubular insulating film causes the insulating film to shrink to cover the surface of exterior can 8 with the insulating film. The insulating film can suppress a short circuit between exterior can 8 and other members.

In the description of the present exemplary embodiment, for convenience, a surface of housing 6 on first surface 6a is an upper surface of each power storage device 2, and a surface of housing 6 on the facing surface is a bottom surface of each power storage device 2. Further, a surface of housing 6 on the long side surface is a long side surface of each power storage device 2, and a surface of housing 6 on the short side surface, that is, a surface on second surface 6b is a short side surface of each power storage device 2. Further, in power storage module 1, a surface of each power storage device 2 on the upper surface is an upper surface of power storage module 1, a surface of each power storage device 2 on the bottom surface is a bottom surface of power storage module 1, and a surface of each power storage device 2 on the short side surface is a side surface of power storage module 1. Further, a dimension in a direction in which the upper surface and the bottom surface of power storage module 1 are aligned, that is, a dimension in a vertical direction is defined as a height of power storage module 1. Further, a dimension in an in-plane direction intersecting a height direction of power storage module 1, that is, a dimension in a horizontal plane direction is defined as a width (width×depth) of power storage module 1. Further, making the height of power storage module 1 lower is referred to as reducing the height of power storage module 1.

However, these directions and positions are specified for convenience. Therefore, for example, the part defined as the upper surface in the present invention is not meant to be always above the part defined as the bottom surface. For example, power storage module 1 may be disposed such that the side surface faces downward. In this case, the upper surface and the bottom surface of power storage module 1 are aligned in a horizontal direction, and the height of power storage module 1 is a dimension in the horizontal direction.

The plurality of power storage devices 2 is arranged side by side at predetermined intervals such that the long side surfaces of adjacent power storage devices 2 face each other to form an aggregate. In the present exemplary embodiment, a direction in which the plurality of power storage devices 2 is aligned is defined as first direction X. Further, a direction in which the pair of output terminals 12 is aligned is defined as second direction Y. Further, a direction in which the upper surface and the bottom surface of power storage module 1 are aligned is defined as third direction Z. Output terminals 12 of each power storage device 2 are disposed so as to face in an identical direction. In the present exemplary embodiment, output terminals 12 of each power storage device 2 is disposed so as to face upward for convenience.

Output terminals 12 of the plurality of power storage devices 2 are electrically connected to each other by bus bar 4. Bus bar 4 includes a metal such as copper or aluminum. The plurality of power storage devices 2 is grouped into a plurality of power storage device blocks 3 including the plurality of power storage devices 2. Then, in each power storage device block 3, output terminals 12 having the same polarity are connected in parallel by bus bar 4. Further, output terminals 12 having different polarities of two adjacent power storage device blocks 3 are connected in series by bus bar 4.

In the present exemplary embodiment, for example, power storage device block 3 is formed by three power storage devices 2. Further, two power storage device blocks 3 as described above are prepared. In each power storage device block 3, each power storage device 2 is disposed such that output terminals 12 having the same polarity are adjacent to each other. Further, two power storage device blocks 3 are arranged such that positive electrode terminal 12a of one block and negative electrode terminal 12b of the other block are adjacent to each other. Then, in each power storage device block 3, output terminals 12 having the same polarity are connected in parallel by bus bar 4, and positive electrode terminals 12a and negative electrode terminals 12b in two adjacent power storage device blocks 3 are connected in series by bus bar 4. All power storage devices 2 may be connected in series.

Power storage module 1 has a plurality of separators 5. Each separator 5 is also called an insulating spacer, and includes, for example, an insulating resin. Each separator 5 is disposed between two adjacent power storage devices 2 and electrically insulates between two power storage devices 2. Further, each separator 5 is disposed between power storage devices 2 and an end plate described later, and insulates between power storage devices 2 and the end plate. Examples of the resin configuring separators 5 include thermoplastic resins such as polypropylene (PP), polybutylene terephthalate (PBT), polycarbonate (PC), and Noryl (registered trademark) resin (modified-PPE).

Further, power storage module 1 has a pair of the end plates (not shown) and a pair of restraint members. The plurality of power storage devices 2 and the plurality of separators 5 arranged side by side are sandwiched in first direction X by the pair of end plates. The pair of end plates is disposed so as to be adjacent to power storage devices 2 located at both ends in first direction X via separator 5. The end plates include, for example, metal plates. The pair of restraint members, also called bind bars, are elongated members having first direction X as a longitudinal direction. The pair of restraint members is arranged so as to face each other in second direction Y.

The plurality of power storage devices 2, the plurality of separators 5, and the pair of end plates are interposed between the pair of restraint members. The pair of restraint members have arms protruding toward power storage devices 2 at both ends in first direction X. Screw holes through which screws are screwed are provided on a surface of each end plate facing the long side surface of each power storage device 2. The two arms facing each other in first direction X of each restraint member are provided with through holes through which the screws are inserted.

The plurality of power storage devices 2 and the plurality of separators 5 are alternately arranged and sandwiched between the pair of end plates in first direction X, and are sandwiched between the pair of restraint members in second direction Y. Then, the screws are inserted into the through holes of the restraint members, and the screws are screwed into the screw holes of the end plates. The pair of restraint members are engaged with the pair of end plates in this way, and thus the plurality of power storage devices 2 is restrained. The plurality of power storage devices 2 and the plurality of separators 5 are fastened by the restraint members in a state where a predetermined pressure is applied in first direction X.

The plurality of power storage devices 2 is positioned in first direction X by being fastened in first direction X by the restraint members. For example, after the positioning is completed, bus bar 4 is attached to output terminals 12 of each power storage device 2, and output terminals 12 of the plurality of power storage devices 2 are electrically connected to each other.

In second direction Y, the pair of restraint members may be disposed so as to cover an outer surface of bus bar 4 at a position farther than bus bar 4 from each power storage device 2. Further, the pair of restraint members does not have to cover the outer surface of bus bar 4, but may cover a region of second surface 6b of each power storage device 2 that is not covered by bus bar 4. "The region that is not covered by bus bar 4" is, for example, a region of second surface 6b near a bottom of exterior can 8 in the present exemplary embodiment. When the restraint members cover the region of second surface 6b not covered by bus bar 4, an end of second part 22 and an end of third part 24 may protrude in second direction Y so as to be located at a position farther than the restraint members from power storage devices 2.

The upper surfaces of the plurality of power storage devices 2 are covered with a cover member (not shown). The cover member prevents contact of condensed water, dust, and the like with output terminals 12, bus bar 4, safety valve 14, and the like of each power storage device 2. The cover member includes, for example, an insulating resin.

Figure 2:
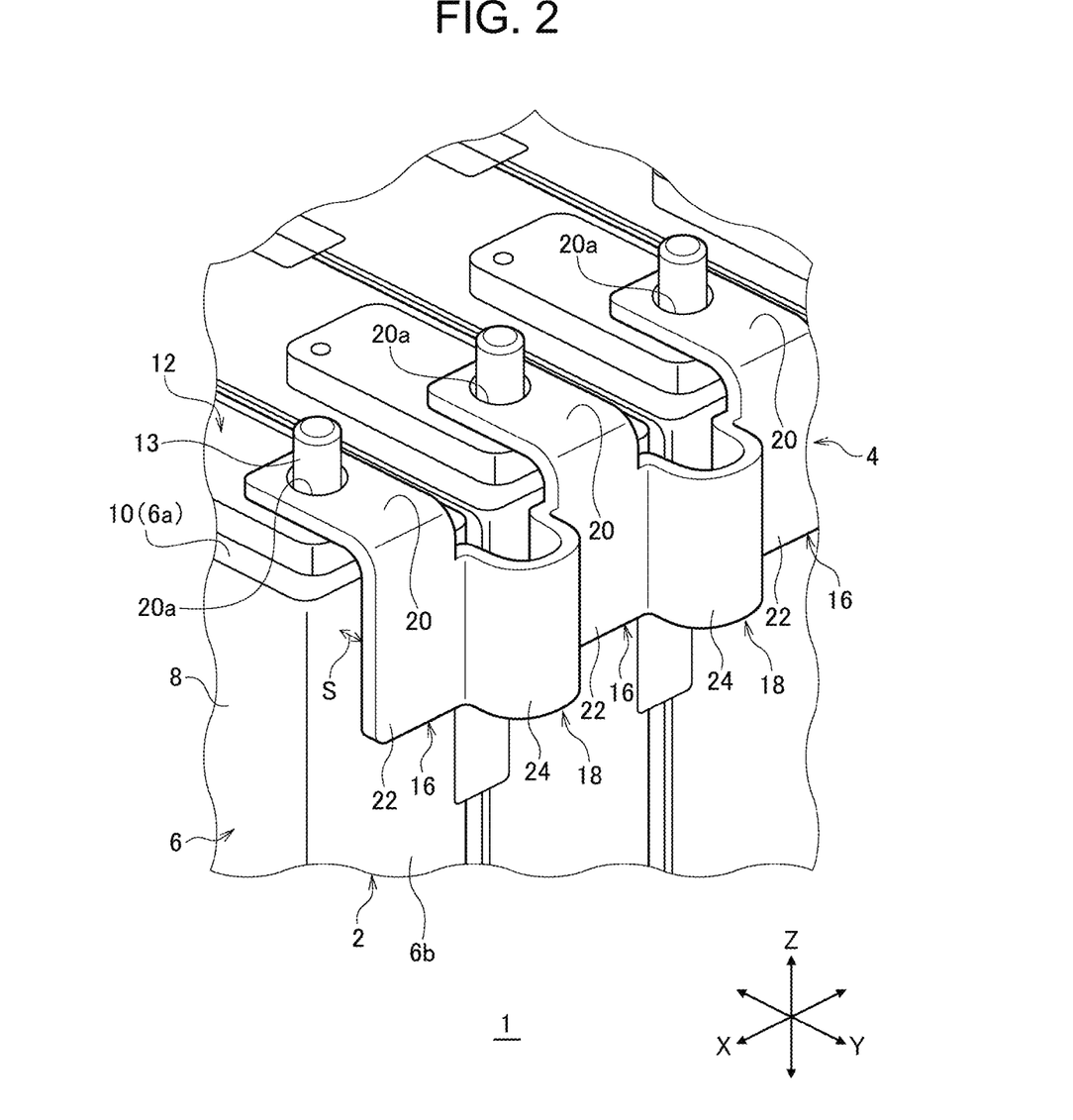
FIG. 2 is an enlarged perspective view of a region including output terminals and a bus bar of the power storage module.

FIG. 2 is an enlarged perspective view of a region including the output terminals and the bus bar of each power storage module. Bus bar 4 according to the present exemplary embodiment has a plurality of terminal connections 16 and a plurality of linking parts 18. Each terminal connection 16 is a part connected to each output terminal 12 of each power storage device 2. Specifically, each terminal connection 16 has first part 20 and second part 22. First part 20 and second part 22 are plate-shaped.

First part 20 extends along first surface 6a of housing 6 and is connected to output terminal 12. For example, first part 20 of the present exemplary embodiment has through hole 20a. Further, output terminal 12 has protrusion 13 protruding in third direction Z. Then, protrusion 13 is inserted into through hole 20a, and in this state, first part 20 is joined to output terminal 12 by welding or the like. As a result, output terminal 12 and bus bar 4 are electrically connected. Second part 22 extends continuously from first part 20 and extends along second surface 6b spreading in a direction intersecting first surface 6a of housing 6. First surface 6a is a surface parallel to an XY plane, and second surface 6b is a surface parallel to an XZ plane. Through hole 20a of first part 20 may be replaced with a notch (not shown) formed at an edge of first part 20, and protrusion 13 may be locked in this notch.

Output terminal 12 according to the present exemplary embodiment has protrusion 13, and protrusion 13 and first part 20 are welded to each other, but the configuration is not limited to this. For example, an upper surface of output terminal 12 in contact with a lower surface of first part 20 and first part 20 may be welded. In this case, protrusion 13 may be omitted. Further, the upper surface of output terminal 12 may be provided with a recess into which first part 20 is fitted. When output terminal 12 has protrusion 13, protrusion 13 may have a height sufficient to fit into through hole 20a and lock first part 20 to output terminal 12. Further, protrusion 13 may be provided with a screw groove, and a nut may be fitted into protrusion 13 with protrusion 13 inserted into through hole 20*a*. As a result, first part 20 can be fixed to output terminal 12.

Each terminal connection 16 according to the present exemplary embodiment includes a single metal plate. That is, in each terminal connection 16, one end of the metal plate extends along first surface 6*a* of housing 6 to configure first part 20, the metal plate is bent at a substantially right angle at a central part, and the other end of the metal plate extends along second surface 6*b* of housing 6 to configure second part 22. The bent central part may be interpreted as a part of first part 20 or a part of second part 22. Further, in the present exemplary embodiment, a dimension of second part 22 in a direction perpendicular to first surface 6*a* is larger than a dimension of first part 20 in a direction perpendicular to second surface 6*b*. The direction perpendicular to first surface 6*a* is a height direction of power storage devices 2, and is third direction Z in the present exemplary embodiment. The direction perpendicular to second surface 6*b* is a longitudinal direction of sealing plate 10, and is second direction Y in the present exemplary embodiment.

One end of first part 20 of terminal connection 16 is connected to protrusion 13 of output terminal 12 and extends along first surface 6*a*, and the other end of first part 20 is located closer to second surface 6*b* than the one end is. One end of second part 22 is connected to the other end of first part 20 and extends along second surface 6*b*, and the other end of second part 22 is located close to the bottom surface of power storage module 1 than the one end is. Second part 22 has gap S between second part 22 and second surface 6*b* of housing 6. Gap S and the insulating film covering exterior can 8 can suppress a short circuit between exterior can 8 and bus bar 4.

Each linking part 18 connects the plurality of terminal connections 16, specifically, adjacent terminal connections 16 in first direction X. Each linking part 18 has third part 24 that connects second parts 22 of adjacent terminal connections 16 to each other. Third part 24 is plate-shaped.

Third part 24 includes a single metal plate and is disposed on the side surface of power storage module 1. That is, third part 24 is disposed so as to overlap the side surface of power storage module 1 when viewed in second direction Y, in other words, to overlap two second surfaces 6*b* of adjacent housings 6 and a boundary of second surfaces 6*b*. Further, first part 20, second part 22, and third part 24 according to the present exemplary embodiment are integrally formed by bending a single metal plate.

Third part 24 according to the present exemplary embodiment has a shape that is curved in a direction separating from second surface 6*b* of housing 6. That is, one end of third part 24 is connected to one second part 22, the other end of third part 24 is connected to another second part 22, and an intermediate part is curved so as to protrude from second part 22 in second direction Y. Third part 24, having a curved shape, can be easily transformed following a displacement when two adjacent power storage devices 2 are relatively displaced. As a result, the displacement of power storage devices 2 can be absorbed by bus bar 4.

Third part 24 may have a bent shape having a corner. Further, bus bar 4 may be shaped such that second part 22 is separated from second surface 6*b* by more than or equal to a protrusion amount of third part 24 and third part 24 is curved or bent in a direction of approaching from second part 22 toward second surface 6*b*.

Further, linking part 18 according to the present exemplary embodiment has only third part 24. Therefore, first parts 20 of adjacent terminal connections 16 are electrically connected to each other only via second part 22 and third part 24 of linking part 18. That is, adjacent first parts 20 are discontinuous on first surface 6*a*, and there is a space between two first parts 20. As a result, bus bar 4 can more easily follow the relative displacement of two adjacent power storage devices 2. Thus, the displacement of power storage devices 2 can be absorbed more reliably.

As described above, power storage module 1 according to the present exemplary embodiment includes the plurality of power storage devices 2 and bus bar 4 electrically connecting the plurality of power storage devices 2. Each power storage device 2 has housing 6 and the pair of output terminals 12 disposed on first surface 6*a* of housing 6. Bus bar 4 has the plurality of terminal connections 16 connected to output terminals 12 of each power storage device 2, and linking part 18 connecting the plurality of terminal connections 16. Each terminal connection part 16 has first part 20 connected to output terminal 12 and second part 22 continuous from first part 20 and extending along second surface 6*b* spreading in the direction intersecting first surface 6*a* of housing 6. Each linking part 18 has third part 24 that connects second parts 22 of adjacent terminal connections 16 to each other.

By routing a part of bus bar 4, that is, second part 22 and third part 24 onto second surface 6*b* of housing 6, a protruding height of bus bar 4 from first surface 6*a* can be reduced. This can reduce the height of power storage module 1.

Further, in a structure in which the entire bus bar is placed on a terminal forming surface of each power storage device, if the thickness of the bus bar is reduced in order to reduce the height of the power storage module, the heat capacity of the bus bar becomes small, and there is a risk that the heat generated at the bus bar may be transferred to the power storage devices. In particular, in recent years, there has been a demand for even higher capacity of power storage modules, and in order to meet this demand, higher capacity of power storage devices has been promoted. As the capacity of a power storage device increases, an amount of current flowing through a bus bar increases, and it is therefore necessary to increase heat capacity of the bus bar. Meanwhile, bus bar 4 according to the present exemplary embodiment has second part 22 and third part 24 disposed on second surface 6*b*. Thus, the heat capacity of bus bar 4 can be secured while reducing a thickness of first part 20 disposed on first surface 6*a*. This makes it possible to suppress heat generated in bus bar 4 from being transferred to power storage devices 2, and to suppress deterioration of performance of power storage devices 2 due to the heat.

In the present exemplary embodiment, it is possible to cope with an increase in the amount of current flowing through bus bar 4 as the capacity of power storage devices 2 increases, while reducing the height of power storage module 1. It is therefore possible to reduce the height and increase the capacity of power storage module 1.

Further, in the present exemplary embodiment, first parts 20 of adjacent terminal connection parts 16 are electrically connected to each other only via second part 22 and third part 24. That is, adjacent first parts 20 are discontinuous on first surface 6*a*. As a result, first parts 20 can easily follow the relative displacement of adjacent power storage devices 2. Therefore, a load applied to the connection between power storage devices 2 and bus bar 4 can be reduced, and an electrical connection of the plurality of power storage devices 2 can be stably maintained.

Further, third part 24 according to the present exemplary embodiment has a shape that is curved or bent in a direction approaching toward or separating from second surface 6*b* of housing 6. As a result, third part 24 is easily transformed due to the relative displacement of adjacent power storage devices 2. Therefore, the electrical connection of the plurality of power storage devices 2 can be stably maintained. Further, third part 24 having a curved shape or a bent shape is disposed on second surface 6b, and thus the height of power storage module 1 can be further reduced.

Further, in the structure in which the entire bus bar is placed on the terminal forming surface, the height of the power storage module will increase if the curved part is increased in response to an increase in an expansion amount due to the increase in the capacity of power storage devices 2. However, in the present exemplary embodiment, it is possible to prevent a reduction in the height of power storage module 1 even when third part 24 is increased in size in response to the increase in the expansion amount of power storage devices 2.

Further, in bus bar 4 according to the present exemplary embodiment, the dimension of second part 22 in the direction perpendicular to first surface 6a is larger than the dimension of first part 20 in the direction perpendicular to second surface 6b. That is, second part 22 is longer than first part 20. This configuration can increase a surface area of bus bar 4 while avoiding an increase in size of first part 20. As a result, heat dissipation of bus bar 4 can be enhanced while reducing the height of power storage module 1.

Further, a volumetric energy density of power storage module 1 can be increased by reducing the height of power storage module 1. For example, assume that housing 6 of each power storage device 2 has a long shape in which the dimension (width) of second direction Y is more than twice the dimension (height) of third direction Z. In this case, a total size of a dead space caused by the protrusion of third part 24 when third part 24 is placed on the pair of second surfaces 6b is smaller than a size of a dead space caused by the protrusion of third part 24 when third part 24 is placed on first surface 6a. Therefore, the volumetric energy density can be increased by reducing the height of power storage module 1.

Second Exemplary Embodiment

Figure 3:
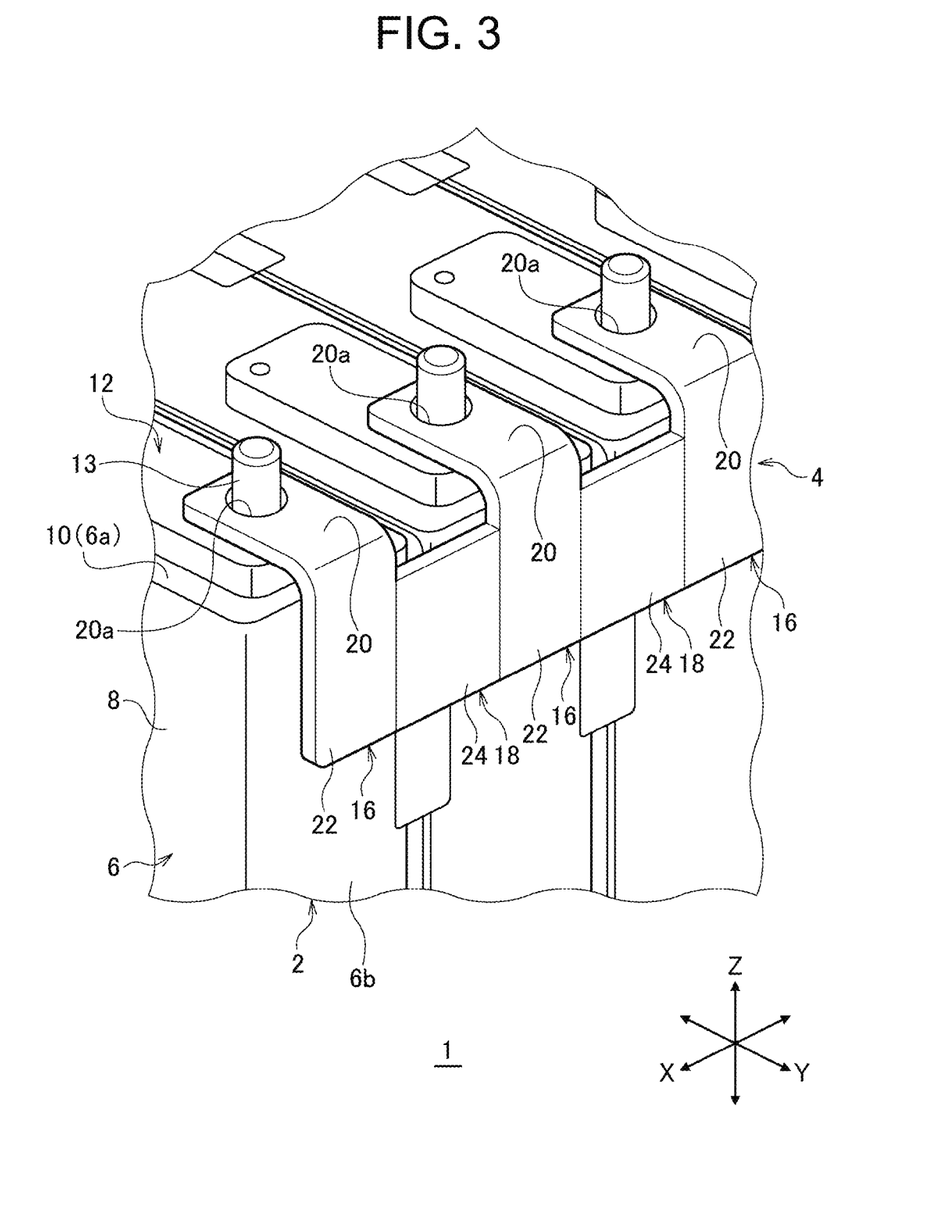
FIG. 3 is an enlarged perspective view of a region including output terminals and a bus bar of a power storage module according to a second exemplary embodiment.

A second exemplary embodiment has the same configuration as the first exemplary embodiment except for the shape of bus bar 4. Hereinafter, a configuration of the present exemplary embodiment that is different from that of the first exemplary embodiment will be mainly described, and the common configuration will be briefly described or not described. FIG. 3 is an enlarged perspective view of a region including output terminals and a bus bar of a power storage module according to the second exemplary embodiment.

Bus bar 4 included in power storage module 1 according to the present exemplary embodiment has the plurality of terminal connections 16 connected to output terminals 12 of each power storage device 2, and linking part 18 connecting the plurality of terminal connections 16. Each terminal connection 16 has first part 20 connected to output terminal 12 and second part 22 continuous from first part 20 and extending along second surface 6b of housing 6. Each linking part 18 has third part 24 that connects second parts 22 of adjacent terminal connections 16 to each other. Linking part 18 according to the present exemplary embodiment has only third part 24. Further, third part 24 has a flat shape, unlike in the first exemplary embodiment, and extends in parallel to the side surface of power storage module 1.

In the present exemplary embodiment, second part 22 and third part 24 of bus bar 4 are also routed onto second surface 6b of housing 6, and thus the protruding height of bus bar 4 from first surface 6a can be reduced. This can reduce the height of power storage module 1. Third part 24, having a flat shape, allows an installation area of power storage module 1 to be reduced. Furthermore, the volumetric energy density of power storage module 1 can be further increased. Further, the shape of bus bar 4 can be simplified as compared with when third part 24 has a curved shape or a bent shape. Therefore, a manufacturing process of bus bar 4 can be simplified.

Third Exemplary Embodiment

Figure 4:
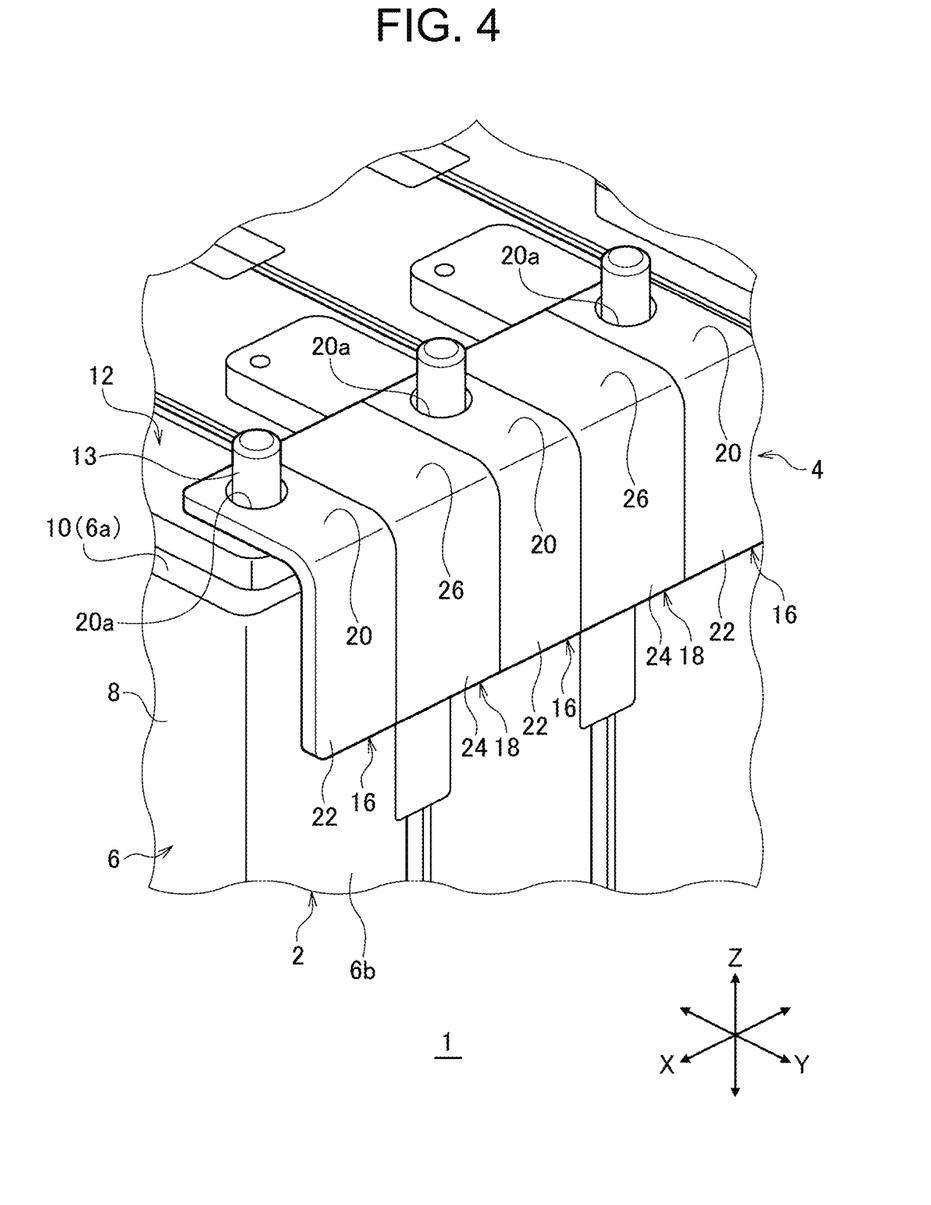
FIG. 4 is an enlarged perspective view of a region including output terminals and a bus bar of a power storage module according to a third exemplary embodiment.

A third exemplary embodiment has the same configuration as the first exemplary embodiment except for the shape of bus bar 4. Hereinafter, a configuration of the present exemplary embodiment that is different from that of the first exemplary embodiment will be mainly described, and the common configuration will be briefly described or not described. FIG. 4 is an enlarged perspective view of a region including output terminals and a bus bar of a power storage module according to the third exemplary embodiment.

Bus bar 4 included in power storage module 1 according to the present exemplary embodiment has the plurality of terminal connections 16 connected to output terminals 12 of each power storage device 2, and linking part 18 connecting the plurality of terminal connections 16. Each terminal connection 16 has first part 20 connected to output terminal 12 and second part 22 continuous from first part 20 and extending along second surface 6b of housing 6. Each linking part 18 has third part 24 that connects second parts 22 of adjacent terminal connections 16 to each other. Third part 24 has a flat shape as in the second exemplary embodiment, and extends in parallel to the side surface of power storage module 1.

Further, linking part 18 according to the present exemplary embodiment has fourth part 26 in addition to third part 24. Fourth part 26 extends on first surface 6a of housing 6 and connects first parts 20 of adjacent terminal connections 16 to each other. Fourth part 26 has a flat shape and extends in parallel to first surface 6a. In the present exemplary embodiment, third part 24 and fourth part 26 include one metal plate.

That is, in each linking part 18, one end of the metal plate extends along first surface 6a of housing 6 to configure fourth part 26, the metal plate is bent at a substantially right angle at a central part, and the other end of the metal plate extends along second surface 6b of housing 6 to configure third part 24. The bent central part may be interpreted as a part of third part 24 or a part of fourth part 26. Further, first part 20, second part 22, third part 24, and fourth part 26 according to the present exemplary embodiment are integrally formed by bending a single metal plate.

In the present exemplary embodiment, second part 22 and third part 24 of bus bar 4 are also routed onto second surface 6b of housing 6. Thus, with respect to the current flowing through the bus bar, a cross-sectional area of an energization path can be increased as compared with the bus bar in which first parts 20 are directly connected to each other. Therefore, the protruding height of bus bar 4 from first surface 6a can be reduced, and an increase in a resistance of bus bar 4 can be suppressed. This can reduce the height of power storage module 1. Third part 24, having a flat shape, allows an installation area of power storage module 1 to be reduced. Furthermore, the volumetric energy density of power storage module 1 can be further increased. Further, the shape of bus bar 4 can be simplified as compared with when third part 24 has a curved shape or a bent shape. Further, adjacent first part 20 is connected by fourth part 26, an electric resistance of bus bar 4 can therefore be reduced, and the heat capacity of bus bar 4 can be increased.

Dimensions of second part 22 and third part 24 in third direction Z may be larger than a dimension of first part 20 in second direction Y. This configuration can increase the cross-sectional area of the energization path in bus bar 4. It is therefore possible to reduce the resistance of bus bar 4 while reducing the height of power storage module 1. Also, by making a thickness of second part 22 and third part 24 larger than a thickness of first part 20 and fourth part 26, the height of power storage module 1 and the resistance of bus bar 4 can be reduced.

Fourth Exemplary Embodiment

Figure 5:
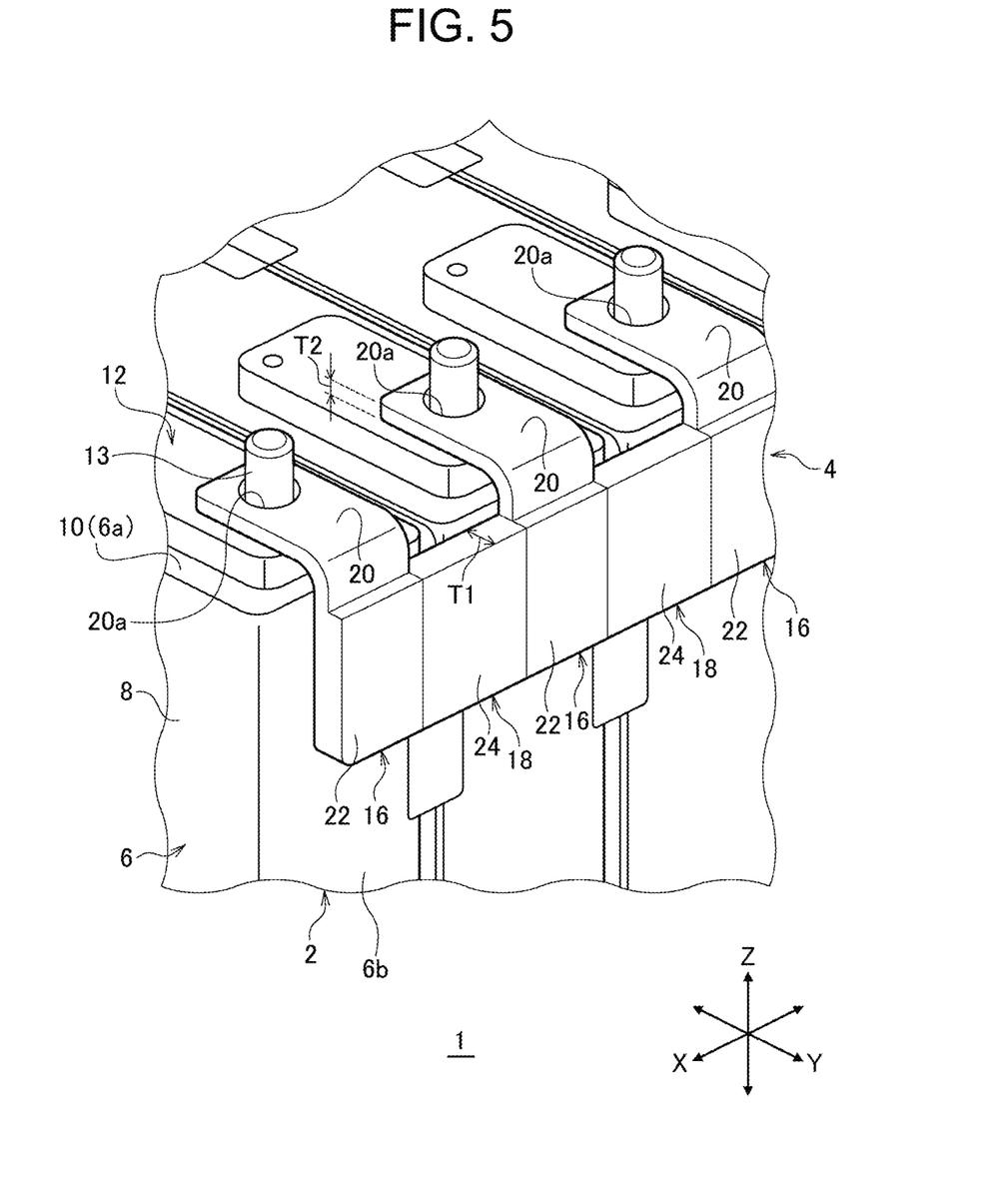
FIG. 5 is an enlarged perspective view of a region including output terminals and a bus bar of a power storage module according to a fourth exemplary embodiment.

A fourth exemplary embodiment has the same configuration as the first exemplary embodiment except for the shape of bus bar 4. Hereinafter, a configuration of the present exemplary embodiment that is different from that of the first exemplary embodiment will be mainly described, and the common configuration will be briefly described or not described. FIG. 5 is an enlarged perspective view of a region including output terminals and a bus bar of a power storage module according to the fourth exemplary embodiment.

Bus bar 4 included in power storage module 1 according to the present exemplary embodiment has the plurality of terminal connections 16 connected to output terminals 12 of each power storage device 2, and linking part 18 connecting the plurality of terminal connections 16. Each terminal connection 16 has first part 20 connected to output terminal 12 and second part 22 continuous from first part 20 and extending along second surface 6b of housing 6. Each linking part 18 has third part 24 that connects second parts 22 of adjacent terminal connections 16 to each other. Linking part 18 according to the present exemplary embodiment has only third part 24. Further, third part 24 has a flat shape as in the second exemplary embodiment, and extends in parallel to the side surface of power storage module 1.

Further, in the present exemplary embodiment, thickness T1 (size in second direction Y) of second part 22 and third part 24 is larger than thickness T2 (size in third direction Z) of the first part. That is, second part 22 and third part 24 have a thick-walled part that is thicker than first part 20.

In the present exemplary embodiment, second part 22 and third part 24 of bus bar 4 are also routed onto second surface 6b of housing 6, and thus the protruding height of bus bar 4 from first surface 6a can be reduced. This can reduce the height of power storage module 1. Further, second part 22 and third part 24 are thicker than first part 20, and thus the heat capacity of bus bar 4 can be further increased while reducing the height of power storage module 1. This makes it possible to further suppress heat generated in bus bar 4 from being transferred to power storage devices 2, and to further suppress deterioration of performance of power storage devices 2.

When the thickness of at least one of second part 22 or third part 24 is larger than the thickness of first part 20, the heat capacity of bus bar 4 can be increased. When the thickness of at least a partial region of second part 22 and/or third part 24 is larger than the thickness of first part 20, the heat capacity of bus bar 4 can be increased. Third part 24 may have a curved or bent shape as in the first exemplary embodiment. Bus bar 4 may have fourth part 26 as in the third exemplary embodiment.

Fifth Exemplary Embodiment

Figure 6:
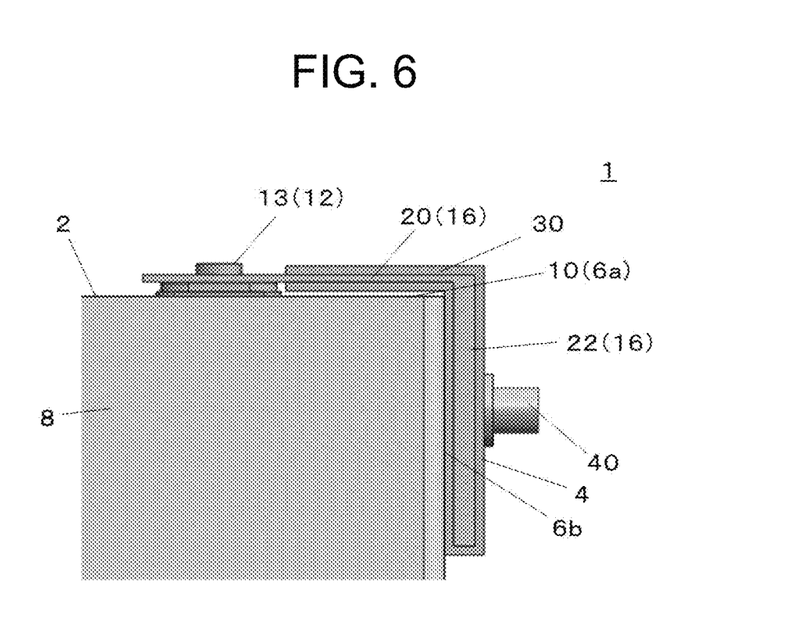
FIG. 6 is a partial excerpt of a power storage device and a bus bar of a power storage module according to a fifth exemplary embodiment.

FIG. 6 is a partial excerpt of power storage device 2 and bus bar 4 used in power storage module 1 according to the present exemplary embodiment. As shown in FIG. 6, in a fifth exemplary embodiment, the surface of bus bar 4 connected to protrusion 13 of output terminal 12 is covered with insulating part 30. Further, coupling part 40 is provided at the linking part of bus bar 4. Insulating part 30 covers a part of first part 20 of terminal connection 16 that does not face output terminal 12 and a part where coupling part 40 of second part 22 and the linking part is not formed. By providing insulating part 30, it is easy to insulate exterior can 8 of each power storage device 2 from second surface 6b and sealing plate 10 (first surface 6a). It is therefore easy to bring bus bar 4 into contact with sealing plate 10 and exterior can 8 to be fixed, and it is easy to position bus bar 4 in power storage module 1. Insulating part 30 may be formed, for example, by insert molding into bus bar 4. Further, by providing coupling part 40 on bus bar 4 and providing a recess or a hole (not shown) in each restraint member holding the plurality of power storage devices 2, bus bar 4 can be fixed with the coupling part inserted into the recess or the hole. Therefore, when power storage module 1 is assembled, bus bar 4 and the restraint members can be assembled and positioned at once, and the workability is improved.

Sixth Exemplary Embodiment

Figure 7:
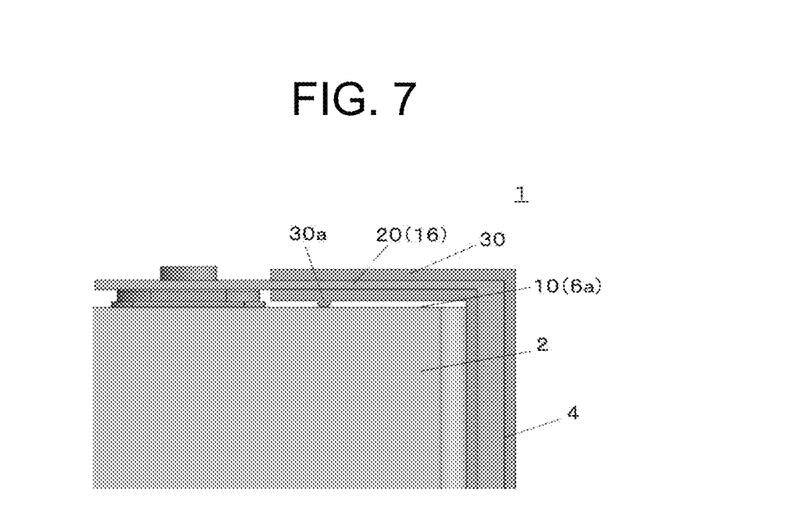
FIG. 7 is a partial excerpt of a power storage device and a bus bar of a power storage module according to a sixth exemplary embodiment.

FIG. 7 is a partial excerpt of power storage device 2 and bus bar 4 used in power storage module 1 according to the present exemplary embodiment. As shown in FIG. 7, in a sixth exemplary embodiment, insulating part 30 covers the surface of bus bar 4 as in the fifth exemplary embodiment. Insulating part 30 is provided with a region that covers the surface of terminal connection 16 that faces sealing plate 10 (first surface 6a) of first part 20. Rib 30a protruding toward sealing plate 10 is provided in a part of this region. Rib 30a facilitates the positioning of the plurality of power storage devices 2 in power storage module 1 in third direction Z. Further, in insulating part 30, rib 30a may be in contact with sealing plate 10, and a region around rib 30a may be in non-contact with the sealing plate. This configuration can limit locations of insulating plate 30 that is in contact with sealing plate 10. It is therefore possible to prevent the position of each power storage device 2 that is in contact with insulating part 30 from being varied for each power storage device 2 due to intended or unintended unevenness on first surface 6a including sealing plate 10. Rib 30a may include an insulating material configuring insulating part 30, a rib (not shown) may be formed at a position where rib 30a of first part 20 is formed, and the rib of first part 20 may be covered with insulating part 30. This configuration can prevent rib 30a from being displaced.

The exemplary embodiments of the present invention have been described in detail above. The above exemplary embodiments merely show specific examples in implementing the present invention. The content of the exemplary embodiments does not limit the technical scope of the present invention, and many design changes such as modification, addition, and deletion of components can be made without departing from the spirit of the invention defined in the claims. The new exemplary embodiments with design changes have the effects of the combined exemplary embodiments and modifications. In the above exemplary embodiments, the contents that can be changed in design are emphasized by adding notations such as "according to the present exemplary embodiment" and "in the present exemplary embodiment". However, design changes are allowed for contents without such notations. Further, any combination of components included in each exemplary embodiment is also effective as an aspect of the present invention. Hatching attached to the cross sections in the drawings does not limit a material of the objects to which the hatching is attached.

In addition to the insulating film, an insulating sheet, an insulating plate, an insulating block, or the like may be interposed between second part 22 and third part 24 of bus bar 4 and second surface 6b of housing 6. Further, an end of the separator interposed between adjacent power storage devices 2 in second direction Y may protrude from second surfaces 6b of power storage devices 2, and second part 22 and third part 24 may be into contact with this end. These configurations can more reliably suppress a short circuit between bus bar 4 and exterior can 8. A number of power storage devices 2 included in power storage module 1 and a number of power storage devices 2 configuring each power storage device block 3 are not limited. A structure of each part of power storage module 1 including a fastening structure of the end plates and the restraint members is not limited. Power storage module 1 may include a bus bar plate. The bus bar plate is a plate-shaped member that is disposed so as to face the upper surfaces of the plurality of power storage devices 2 and covers the upper surfaces. The shape of the opening of exterior can 8 may be a quadrangle such as a square, a polygonal shape other than a quadrangle, or the like.

REFERENCE MARKS IN THE DRAWINGS 1 power storage module
4 bus bar
6 housing
6a first surface
6b second surface
12 output terminal
16 terminal connection
18 linking part
20 first part
22 second part
24 third part
26 fourth part

The invention claimed is:

1. A power storage module comprising:
a plurality of power storage devices; and
a bus bar electrically connecting at least two continuously adjacent ones of the plurality of power storage devices, wherein:
each of the plurality of power storage devices has a housing and a pair of output terminals disposed on a first surface of the housing,
the bus bar has a plurality of terminal connections each of which is connected to corresponding one of the pair of output terminals of each of the at least two continuously adjacent ones of the plurality of power storage devices and a linking part connecting the plurality of terminal connections,
each of the plurality of terminal connections has a first part connected to one of the pair of output terminals and a second part that is continuous from the first part and extends along a second surface expanding in a direction intersecting the first surface of the housing,
the linking part has a third part connecting the second part of one of the plurality of terminal connections and the second part of an adjacent one of the plurality of terminal connections adjacent to the one of the plurality of terminal connections,
the bus bar has an insulating part covering a surface facing the plurality of power storage devices,
the insulating part has a region covering a surface of the first part facing the first surface, and
a rib protruding toward the first surface is disposed in a part of the region.

2. The power storage module according to claim 1, wherein the first part of one of the plurality of terminal connections and the first part of an adjacent one of the plurality of terminal connections adjacent to the one of the plurality of terminal connections.

3. The power storage module according to claim 1, wherein the third part is curved or bent in a direction approaching toward or separating from the second surface.

4. The power storage module according to claim 1, wherein the linking part has a fourth part extending on the first surface and connecting the first part of one of the plurality of terminal connections and the first part of an adjacent one of the plurality of terminal connections adjacent to the one of the plurality of terminal connections.

5. The power storage module according to claim 1, wherein
the first part, the second part and the third part are plate-shaped, and
at least one of the second part or the third part has a thickness that is larger than a thickness of the first part.

6. The power storage module according to claim 1, wherein a dimension of the second part in a direction perpendicular to the first surface is larger than a dimension of the first part in a direction perpendicular to the second surface.

7. The power storage module according to claim 1, further comprising a separator having insulation properties and interposed between adjacent power storage devices among the plurality of power storage devices, wherein
the separator has an end protruding from the second surface of the adjacent power storage devices, and
the bus bar is in contact with the end.

8. The power storage module according to claim 1, wherein the bus bar electrically connecting at least three continuously adjacent ones of the plurality of power storage devices.

* * * * *